J. WHEELOCK.
CENTRIFUGAL GOVERNOR FOR STEAM ENGINES.
No. 29,025.  Patented July 3, 1860.
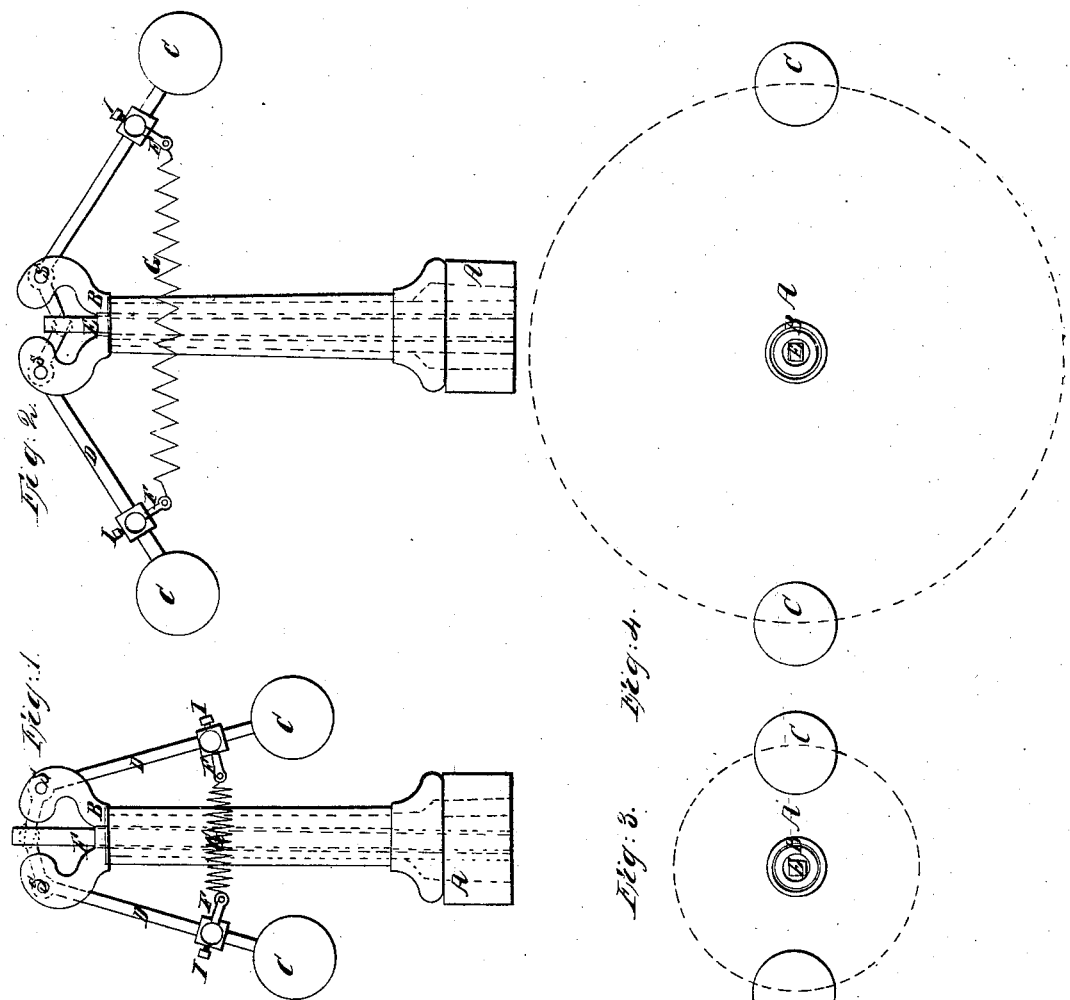

UNITED STATES PATENT OFFICE.

JEROME WHEELOCK, OF WORCESTER, MASSACHUSETTS.

CENTRIFUGAL GOVERNOR FOR STEAM-ENGINES.

Specification of Letters Patent No. 29,025, dated July 3, 1860.

*To all whom it may concern:*

Be it known that I, JEROME WHEELOCK, of the city and county of Worcester and State of Massachusetts, have invented a new and useful Improvement in Centrifugal Governors; and I do hereby declare that the following is a full, clear, and exact description of the construction and arrangement of the same, operating as hereinafter described, reference being had to the annexed drawings, which make a part of this specification, in which—

Figure 1 is an elevation with the balls dropped down or collapsed as when the governor is standing still or running less than required speed. Fig. 2 is an elevation showing the balls thrown up as when running at required speed. Fig. 3 is a section through $x$, $y$, Fig. 1. Fig. 4 is a section through $r$, $s$, Fig. 2, the same letters referring to the same parts in all.

My invention consists in attaching springs to the arms or balls of the common centrifugal governor so as to nearly counterpoise or counteract the centrifugal force of the balls, they acting with an increasing force in proportion as the balls increase in centrifugal force as they pass from a smaller circle to a larger one by the increase of speed.

To construct my machine A, is a stand which supports the other parts of the governor.

B, is a hollow shaft which passes through the stand A, on the bottom of which is a gear by which it is rotated. On the top is a head or projection to which the arms which carry the balls are attached as shown at S, S.

C, C, are the balls by which centrifugal force is generated.

D, D, are arms which carry the balls, being made fast to them at one end and being connected to the shaft B, with pivots at S, S, and extending through the rod E, by which motion is communicated to the throttle valve.

F, F, are hold fasts or hooks fitted loosely upon the arms D, D, and may be moved to any position and then made fast by a set screw I.

G, are spiral springs fastened at their extremities to the hold fasts F, F, and thereby the balls are drawn down or collapsed.

The operation is as follows: First the governor should be rotated about twice the speed of the common governor, the springs should be so adjusted by the holdfasts F, F, so as to hold the balls down as shown in Fig. 1 (holding the valve open) until the engine has gained within about one revolution per minute o fthe required speed, then by an increase of speed of about one revolution per minute they should rise to the position shown in Fig. 2, closing the valve, by a decrease of speed again of one revolution per minute the springs should draw the balls back again to the position shown in Fig. 1. To do this it will be seen that the springs must act with much more force when the balls are in the position shown in Fig. 2 or near that position than in that shown in Fig. 1 for the reason that the balls pass through a much larger circle as may be seen by comparing Fig. 3, with Fig. 4, consequently have a much greater centrifugal force to be overcome.

It will be seen that with a governor thus constructed and arranged an engine cannot vary in speed more than one revolution per minute, and that this arrangement is particularly adapted to old governors now in use which do not work with that required sensitiveness.

I am aware that springs and weights have been used to collapse the balls of centrifugal governors and thereby they may be run at high speed and made much more sensitive in their action than the common governor without them, but the springs or weights acting constantly upon the balls serve either to hold them down while rotating in a small circle and allow the engine to run too fast or to not act with force sufficient to collapse the balls while rotating in a larger circle and thus allow a variation of speed.

The characteristic features of my invention is connecting to the arms or balls of the governor springs or some similar device to act with a double increasing force as the balls pass out, from a smaller to a larger circle increasing in proportion as the centrifugal force increases.

W. Wilmington,
Harvester and Thresher.
No. 29026.                              Patented July 3 1860.
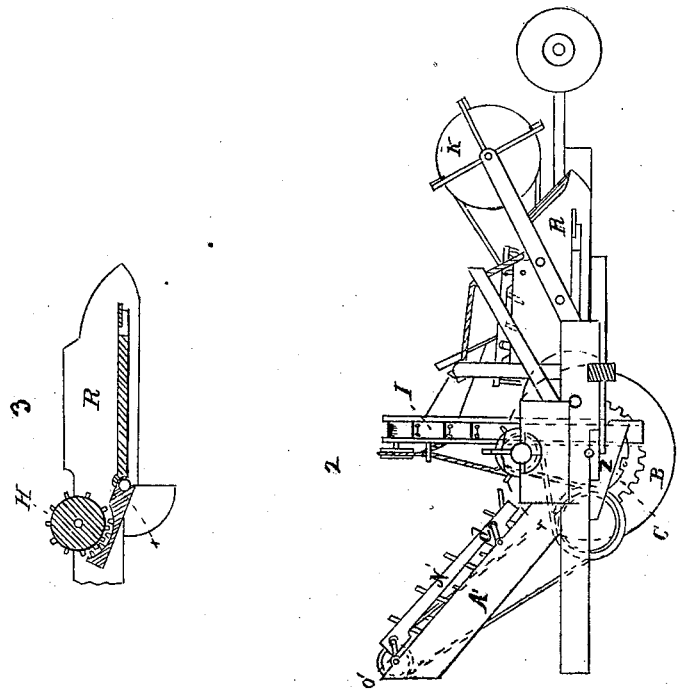
William Wilmington
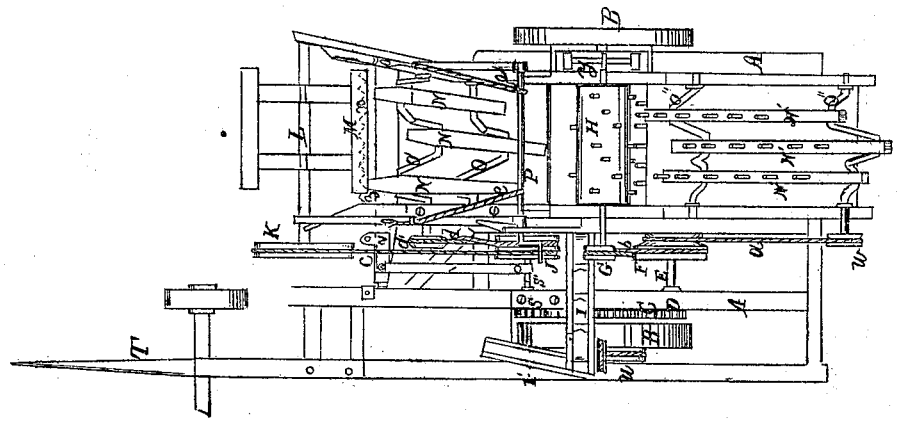

What I claim as new and desire to secure by Letters Patent is—

The holdfasts F, F, and the springs G, G, constructed and operating in the manner as set forth and described.

Whereof I hereunto set my hand.

JEROME WHEELOCK.

Witnesses:
BUNCOMB GILTER,
A. E. WILSON.